(12) United States Patent
Couillard et al.

(10) Patent No.: US 12,098,093 B2
(45) Date of Patent: Sep. 24, 2024

(54) THROUGH-SUBSTRATE LASER PATTERNING AND ISOLATING OF THIN CONDUCTIVE FILMS

(71) Applicants: CORNING INCORPORATED, Corning, NY (US); VIEW, INC., Milpitas, CA (US)

(72) Inventors: James Gregory Couillard, Ithaca, NY (US); Ming-Huang Huang, Ithaca, NY (US); Xinghua Li, Horseheads, NY (US)

(73) Assignees: CORNING INCORPORATED, Corning, NY (US); VIEW, INC., Milpitas, CA (US)

( * ) Notice: Subject to any disclaimer, the term of this patent is extended or adjusted under 35 U.S.C. 154(b) by 1073 days.

(21) Appl. No.: 16/961,800

(22) PCT Filed: Jan. 16, 2019

(86) PCT No.: PCT/US2019/013732
§ 371 (c)(1),
(2) Date: Jul. 13, 2020

(87) PCT Pub. No.: WO2019/143646
PCT Pub. Date: Jul. 25, 2019

(65) Prior Publication Data
US 2021/0070653 A1 Mar. 11, 2021

Related U.S. Application Data

(60) Provisional application No. 62/618,291, filed on Jan. 17, 2018.

(51) Int. Cl.
*B32B 43/00* (2006.01)
*C03C 17/34* (2006.01)
(Continued)

(52) U.S. Cl.
CPC ........ *C03C 17/3417* (2013.01); *B32B 43/006* (2013.01); *B32B 2310/0843* (2013.01);
(Continued)

(58) Field of Classification Search
None
See application file for complete search history.

(56) References Cited

U.S. PATENT DOCUMENTS 9,703,167 B2 7/2017 Parker et al.
2010/0143744 A1 6/2010 Gupta et al.
(Continued)

FOREIGN PATENT DOCUMENTS

CN 101213682 A 7/2008
CN 101499484 A 8/2009
(Continued)

OTHER PUBLICATIONS

Taiwanese Patent Application No. 108101806, Office Action, dated Apr. 17, 2022, 1 page; Taiwanese Patent Office.
(Continued)

*Primary Examiner* — Kim S. Horger
(74) *Attorney, Agent, or Firm* — Daniel J. Greenhalgh (57) ABSTRACT

Embodiments of a composite structure are provided, the composite structure including: a substrate layer, a conductive layer and an overlayer. The conductive layer is disposed between the overlayer and the substrate layer. The substrate layer may comprise a material that is optically transparent over at least a part of the electromagnetic spectrum from 180 nm to 20 μm. The conductive layer includes a thickness of 10 nm or greater, a resistivity of 10 Ω-cm or less, and is an optically translucent or opaque over at least a part of the electromagnetic spectrum from 180 nm to 20 μm.

17 Claims, 2 Drawing Sheets

(51) Int. Cl.
*E06B 9/24* (2006.01)
*G02F 1/155* (2006.01)

(52) U.S. Cl.
CPC .. *C03C 2217/948* (2013.01); *C03C 2218/154* (2013.01); *C03C 2218/328* (2013.01); *E06B 9/24* (2013.01); *E06B 2009/2464* (2013.01); *G02F 1/155* (2013.01)

(56) References Cited

U.S. PATENT DOCUMENTS

| | | | |
|---|---|---|---|
| 2010/0164375 | A1 | 7/2010 | Kajiyama et al. |
| 2010/0221853 | A1 | 9/2010 | Buchel et al. |
| 2013/0320323 | A1 | 12/2013 | Segawa et al. |
| 2016/0168679 | A1* | 6/2016 | Nadaud .............. B23K 26/0626 428/210 |
| 2017/0115544 | A1 | 4/2017 | Parker et al. |
| 2017/0371218 | A1* | 12/2017 | Kailasam ................ G02F 1/153 |

FOREIGN PATENT DOCUMENTS

| | | |
|---|---|---|
| CN | 103392381 A | 11/2013 |
| JP | 2006-267834 A | 10/2006 |
| JP | 2006-269108 A | 10/2006 |
| JP | 2008-181796 A | 8/2008 |
| JP | 2009-500788 A | 1/2009 |
| JP | 2011-124152 A | 6/2011 |
| TW | 201013965 A | 4/2010 |
| WO | 2007/004121 A2 | 1/2007 |
| WO | 2012/172612 A1 | 12/2012 |
| WO | 2014/072137 A1 | 5/2014 |
| WO | WO-2016010943 A2 * | 1/2016 ......... B23K 26/0624 |

OTHER PUBLICATIONS

Chinese Patent Application No. 201980012470.0, Office Action dated Mar. 1, 2023, 4 pages (Original Document Only), Chinese Patent Office.

Japanese Patent Application No. 2020-539695, Office Action, dated Jan. 18, 2023, 12 pages (6 pages of English Translation and 6 pages of Original Copy); Japanese Patent Office.

International Search Report and Written Opinion of the International Searching Authority; PCT/US2019/013732; Mailed Apr. 11, 2019; 19 Pages; European Patent Office.

* cited by examiner

THROUGH-SUBSTRATE LASER PATTERNING AND ISOLATING OF THIN CONDUCTIVE FILMS

This application claims the benefit of priority under 35 U.S.C. § 371 of International Application No. PCT/US2019/013732, filed on Jan. 16, 2019, which claims the benefit of priority under 35 U.S.C. § 119 of U.S. Provisional Application Ser. No. 62/618,291 filed on Jan. 17, 2018, the content of each of which is relied upon and incorporated herein by reference in its entirety.

BACKGROUND

Field

The present disclosure relates generally to laser irradiation of thin films, more specifically, to a method for modifying and isolating conductive layer using a laser.

Technical Background

Many novel products are based on conducting, semiconducting, or isolating thin films. In most applications, the film thicknesses are in the range of nano- to micrometers with the films' primary functions being of optical and electrical nature. A useful process technology for patterning these films requires high process speed, small structure sizes, and applicability to large areas. The combination of high speed printing methods with direct laser patterning offers high resolution at high throughput.

Laser ablation has been proven as a versatile tool for thin film structuring. However, debris within and in the surrounding of the irradiated areas, thermal damage, as well as bulging are all potential issues. Methods have been developed to mitigate these issues by controlling parameters like process atmosphere, wavelength, spatial and temporal pulse shape, and including a cleaning step after laser ablation. However, there continues to be an unmet need for techniques that allow for the controlled patterning of thin films to regulate conductivity and other electrical aspects of the films.

SUMMARY

In an aspect (1), the disclosure provides a composite structure comprising (a) a substrate layer having a first face and a second face opposite the first face, the substrate layer comprising a material that has an optical transparency at a thickness of 2 mm of greater than 70% over at least a part of the electromagnetic spectrum from about 180 nm to about 1000 nm and a resistivity of about 1 k$\Omega$-cm or greater; (b) a conductive layer comprising a material that is optically opaque over at least a part of the electromagnetic spectrum from about 180 nm to about 20 µm, has a thickness of about 10 nm or greater, and comprises at least two regions, an unmodified and modified region, wherein the unmodified region of the conductive layer, and has a resistivity of 10 $\Omega$-cm or less and the modified region of the conductive layer has a resistivity of about 1 k$\Omega$-cm or greater; and the conductive layer further having a first face and a second face, the first face of the conductive layer being disposed on the at least a part of the second face of the substrate; and (c) an overlayer having a first face and a second face, wherein the first face of the overlayer is disposed on at least a part of the second face of the conductive layer such that the at least part of the modified region of the conductive layer is disposed between the overlayer and the substrate layer.

In an aspect (2), the disclosure provides the composite structure of aspect (1), wherein the overlayer disposed above the modified region is substantially the same physically or chemically as the overlayer disposed above the unmodified region. In an aspect (2), the disclosure provides the composite structure of aspect (1) or aspect (2) wherein the modified region is physically or chemically different than the unmodified region. In an aspect (4), the disclosure provides the composite structure of aspect (3), wherein the modified region is physically different, wherein physically different means it has a different resistivity, crystalline structure, different amorphous structure or is made amorphous, adhesion or contact between the overlayer and the modified region is changed, or at least part of the modified region of the conductive layer interdiffuses into another layer in the composite structure. In an aspect (5), the disclosure provides the composite structure of aspect (3), wherein the modified region is chemically different, wherein chemically different means the chemical structure or relative amounts of chemical constituents in a unit cell in the modified region is different from the unmodified region.

In an aspect (6), the disclosure provides the composite structure of any of aspects (1)-(5), wherein the modified region is in physical contact with the overlayer disposed above it. In an aspect (7), the disclosure provides the composite structure of any of aspects (1)-(6), wherein the composite structure of claim 1, wherein the modified region of the conductive layer is spatially separate from the overlayer disposed above it, and the spatial separation is at least 10 nm. In an aspect (8), the disclosure provides the composite structure of aspect (7), wherein the spatially separated region between the conductive layer and the overlayer comprises a gas or void. In an aspect (9), the disclosure provides the composite structure of any of aspects (1)-(8), wherein the modified region of the conductive layer has CIE L*a*b* color coordinates about $\Delta E \geq 3$ different from the unmodified region of the conductive layer. In an aspect (10), the disclosure provides the composite structure of aspect (9), wherein the modified region of the conductive layer has CIE L*a*b* color coordinates about $\Delta E \geq 2$ different from the unmodified region of the conductive layer.

In an aspect (11), the disclosure provides the composite structure of any of aspects (1)-(10), wherein the conductive layer comprises a material selected from the group consisting of an oxide, a metal-based material, an alloy, and a doped material. In an aspect (12), the disclosure provides the composite structure of aspect (11), wherein the oxide comprises a transparent conductive oxide. In an aspect (13), the disclosure provides the composite structure of aspect (11), wherein the transparent conductive oxide comprises a metal oxide. In an aspect (14), the disclosure provides the composite structure of aspect (13), wherein the metal oxide is selected from the group consisting of an oxide of cerium, an oxide of titanium, an oxide of zirconium, an oxide of hafnium, an oxide of tantalum, zinc peroxide, zinc stannate, cadmium stannate, zinc indium oxide, magnesium indium oxide, indium tin oxide, and gallium oxide-indium oxide. In an aspect (15), the disclosure provides the composite structure of aspect (3), wherein the conductive layer is configured to expand in response to heat generated from irradiating at least the conductive layer with a laser. In an aspect (16), the disclosure provides the composite structure of aspect (3), wherein the physically different aspect comprises delamination, and the delamination separates the conductive layer from the substrate. In an aspect (17), the disclosure provides the composite structure of aspect (3), wherein the physically different aspect comprises delamination, and the delamination separates the conductive layer from the overlayer.

In an aspect (18), the disclosure provides a method for modifying multilayered structure, comprising steps of: (a) providing a multilayer structure comprising at least three layers including a substrate layer having a first face and a second face, a conductive layer having a first face and a second face, and an overlayer having a first face and a second face, wherein the first face of the conductive layer is adjacent to the second face of the substrate layer and the second face of the conductive layer is adjacent to the first face of the overlayer; and wherein the substrate layer comprises a material that has an optical transparency at a thickness of 2 mm of greater than 70% over at least a part of the electromagnetic spectrum from about 180 nm to about 1000 nm and a resistivity of about 1 kΩ-cm or greater, the conductive layer comprises a layer having a thickness of about 10 nm or greater and comprises an unmodified and modified region, wherein the unmodified region of the conductive layer has a resistivity of 10 Ω-cm or less; and the conductive layer further having a first face and a second face, the first face of the conductive layer being disposed on the at least a part of the second face of the substrate, and an overlayer having a first face and a second face, wherein the first face of the overlayer is disposed on at least a part of the second face of the conductive layer such that the at least part of the modified region of the conductive layer is disposed between the overlayer and the substrate layer; (b) irradiating a portion of the conductive layer through the substrate layer by using a laser having a wavelength of from about 180 nm to about 20 μm to produce a modified region such that the modified region of the conductive layer irradiated by the laser undergoes a physical or chemical modification and has a resistivity of about 1 kΩ-cm or greater while the overlayer in disposed on the modified region has a resistivity that is unchanged.

In an aspect (19), the disclosure provides the method of aspect (18), wherein the substrate is comprises a glass. In an aspect (20), the disclosure provides the method of aspect (18) or aspect (19), wherein the physical change includes at least one of crystallization, amorphization of the at least one conductive layer, interdiffusion or delamination between adjacent layers. In an aspect (21), the disclosure provides the method of aspect (20), wherein the delamination further includes delamination between the at least one conductive layer with the substrate. In an aspect (22), the disclosure provides the method of aspect (20), wherein the delamination further includes delamination between the at least one conductive layer with the overlayer. In an aspect (23), the disclosure provides the method of any of aspects (18)-(22), wherein the laser irradiation remains below a threshold for laser ablation of the conductive layer. In an aspect (24), the disclosure provides the method of any of aspects (18)-(23), wherein the at least one conductive layer comprises a material selected from the group consisting of an oxide, a metal-based material, an alloy, and a doped material. In an aspect (25), the disclosure provides the method of any of aspects (18)-(24), wherein the thickness of the at least one conductive layer is less than about 1 micron. In an aspect (26), the disclosure provides the method of any of aspects (18)-(25), wherein the overlayer is sandwiched between two conductive layers. In an aspect (27), the disclosure provides the method of aspect (26), wherein the overlayer is made of a material that is selected from the group consisting of transition metal oxides and aluminum oxide ($Al_2O_3$). In an aspect (28), the disclosure provides the method of any of aspects (18)-(27), wherein the wavelength of the laser is selected from the group consisting of about 240 nm to about 360 nm and from about 1.0 micron to about 5.0 microns. In an aspect (29), the disclosure provides the method of aspect (28), wherein the wavelength of the laser is about 266 nm. In an aspect (30), the disclosure provides the method of aspect (28), wherein the wavelength of the laser is about 2 microns.

Additional features and advantages of the present disclosure will be set forth in the detailed description, which follows, and in part will be readily apparent to those skilled in the art from that description or recognized by practicing the embodiments described herein, including the detailed description, which follows, the claims, and the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF SEVERAL VIEWS OF THE DRAWINGS

The following is a description of the figures in the accompanying drawings. The figures are not necessarily to scale, and certain features and certain views of the figures may be shown exaggerated in scale or in schematic in the interest of clarity or conciseness.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed, specific reference of each various individual and collective combinations and permutation of these compounds may not be explicitly disclosed, yet each is specifically contemplated and described herein.

Reference will now be made in detail to the present embodiment(s), examples of which are illustrated in the accompanying drawings. The use of a particular reference character in the respective views indicates the same or like parts.

Broadly, the present disclosure relates to selective laser irradiation of conductive films, and more specifically, to a method for modifying and isolating conductive thin layers using a laser targeted through the support substrate. Many applications involve thin film coatings on glass. As used herein, when referencing a substrate with thin films on it, the substrate will be considered as being on the bottom with the first coating being laid down on the "top" of the substrate and each subsequent coating being coated "on top of" the previous coating, which is "below" the later coating.

Patterning of thin film coatings can be done any number of ways, including through the use of lasers to scribe or remove material. The literature provides numerous examples of laser patterning of thin films. However, almost all patterning in the literature is done in a "top-down" manner, wherein the laser does not have to pass through the substrate. The advantages to not directing the beam through the substrate are many—it is unnecessary to take the absorbance of the substrate into account, focal optics are easier design, no chance of damaging the substrate, etc. However, there are limitations to a top-down approach as well. In some instances, it may be necessary or desirable to pattern only certain layers of a multi-layer structure or selectively pattern some film layers after all layers have been coated while leaving the other layers intact and undamaged. Because each layer is generally very thin (nm to µm in thickness), it is almost impossible to use a top-down approach to selectively pattern any of the coatings below the top coating unless the top coating(s) is removed as well. In essence, the literature has shown that a top-down approach is limited to those instances where it is acceptable to use the laser to pattern a channel with a depth equivalent to the level of the film it is desired to pattern.

The present disclosure is directed to an alternative to the top-down approach described above. The present disclosure's bottom-up approach of directing a laser through the substrate allows for the selective patterning of first coated film layers without having to remove, damage, or pass through the top coat. Laser processes that can alter the physical or chemical properties of the thin film in contact with the glass without damaging other adjacent thin film layers are particularly advantageous because traditional top-down laser ablation processes generate shock waves and localized pressure increases that lead to damage of adjacent films. A bottom-up approach to laser patterning provides a new way to manipulate the various layers and introduce new flexibility into thin film device design and, as noted below, allows for improvements in process design.

A particular thin-film application that benefits from the present disclosure is in the area of electrochromic films. Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. Electrochromatic devices are used, for example, in automotive mirrors, but have not expanded substantially into the commercial and residential architecture due to costs associated with processes for making the windows.

Electrochromic windows are made by forming an electrochromic device on a pane of transparent material. Because of the sensitivity of the films to dust and other particles and, in the case of most electrochromic films, the materials being moisture and oxygen sensitive, the coating processes are generally done under vacuum or low pressure in a controlled environment. In order for the electrochromic films to tint uniformly, distinct regions must be defined within the film stack using either mechanical or laser isolation. Isolation was traditionally done via laser ablation at two points in the film deposition sequence: once after the first layer and again after the final layer in the stack. The laser is focused on the film from the top surface at sufficiently high laser flux to either ablate the film materials or convert the materials to a plasma and completely remove them from the glass surface.

However, interrupting the film deposition process to do multiple isolation steps has two drawbacks. First, it requires interrupting the coating process, which adds complexity and lowers yield. Breaking vacuum slows the process and increases the likelihood of particles being incorporated into the film, which can lead to electrical short defects in the finished device. Second, isolation/patterning of the initial layers requires knowing the final product geometry at the start of the process. This limits manufacturing flexibility and is particularly challenging for architectural windows where windows can be nearly an infinite number of sizes and turnaround times for purchase requests are typically very short. For these reasons, a method of defining isolation regions in the lower conductive film layers after completing film deposition would be preferred. It would allow for the creation of large, fully coated "mother sheets" to be manufactured and stored, and then subsequently patterned and cut to fit a purchase request.

In one embodiment, the current disclosure teaches a process of isolating a conductive oxide thin film layer, such as indium tin oxide, in contact with a transparent substrate using a delamination and isolation approach. More specifically, the disclosure describes a method for using a laser directed through a transparent substrate to define isolation regions in a film stack after completing film deposition. Rather than ablating the layers where the process disrupts the sheet resistance/resistivity in the film, the laser passes through glass with minimal absorption and is preferentially absorbed at the lowest layer(s) of the film stack.

In another embodiment, a film's electronic properties, such as resistivity or conductivity, can be altered due to physical or chemical modification of the film. Such alterations can include: changes in bulk structure—meaning the pre-lased, homogeneous film's physical structure is mechanically changed, for example converted into particles, cracked or isolated from the bulk, etc.; changes in crystallization—meaning changes or modifications to crystal structure, such as changes in crystal system, addition of defects (interstitial, vacancy, Frenkel, line, planar, bulk etc.) or changing from crystalline to amorphous (amorphization) or from amorphous to crystalline; interdiffusion of atoms or electrons between adjacent layers or changes in film stoichiometry; transient phase change from a solid film to a liquid or gas (vaporization, as opposed to ablation); chemical reaction of the film materials alone or in combination with adjacent materials; or a combination of these. Advantageously, the processes described herein allow the conductivity in overlying layers to remain relatively unchanged.

In some embodiments, the modified region will be identifiable via optical, microscopic, or spectroscopic methods, including for example, light microscope, electron microscope, atomic force microscope, scanning tunneling microscope, and the like. In other embodiments, the modified region may look identical to the unmodified region, and electrical methods may be the only way to determine where the modified region is located.

Figure 1:
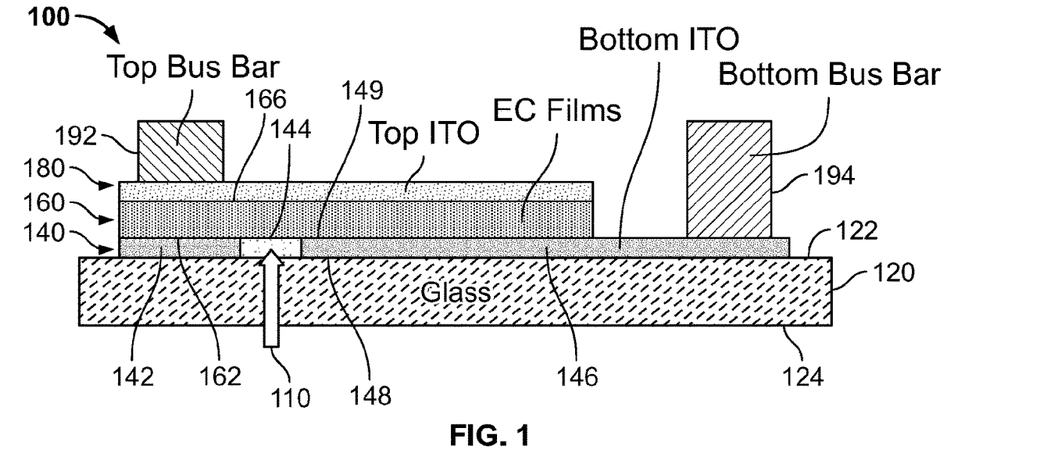
FIG. 1 illustrates a schematic cross-section of electrochromic device showing laser disruption to lower indium tin oxide layer.

An example thin-film device is shown in FIG. 1, wherein a composite structure 100, such as an electrochromic device, may include a substrate layer 120, a first conductive layer 140 and an overlayer 160, i.e., an electrochromic film. The substrate 120 may have a first face 124 and a second face 122 opposite the first face 124, a modified region 144 and an unmodified region 142 or 146 adjacent to each other. The first conductive layer 140 may have a first face 148 and a second face 149. The overlayer 160 may include a first face 162 and a second face 166. The first face 148 of the first conductive layer 140 is adjacent to the second face 122 of the substrate layer 120 and the second face 149 of the conductive layer 140 is adjacent to the first face 162 of the overlayer 160. The first conductive layer 140 may be disposed on the at least a part of the second face 122 of the substrate 120. The first face 148 of the conductive layer 140 is adjacent to the second face 122 of the substrate layer 120 and the second face 149 of the conductive layer 140 is adjacent to the first face 162 of the overlayer 160.

The overlayer 160 may be disposed on at least a part of the first conductive layer 140 such that the first conductive layer 140 may be disposed between the overlayer 160 and the substrate 120. The composite structure 100 may further include a second conductive layer 180 so that the overlayer 160 may be disposed between the first conductive layer 140 and the second conductive layer 180. A first bus bar 192 may be disposed on the top of the second conductive layer 180. A second bus bar 194 may be disposed on the top of the first conductive layer 140. The first bus bar 192 and the second bus bar 194 may be used to power the composite structure 100.

The substrate layer 120 may comprise a material that is optically transparent over at least a part of the electromagnetic spectrum from about 180 nm to about 20 µm, for example. The first conductive layer 140 may comprise a layer having a thickness of about 10 nm or greater, for example, and having a resistivity of about 100, 50, 25, 10, or 5 Ω-cm or less, for example. The overlayer, i.e., the electrochromic film 160, may comprise a material that is optically opaque over at least a part of the electromagnetic spectrum from about 180 nm to about 20 µm, for example. In some embodiments, the electrochromic film 160 may comprise a material that is optically more absorbing than the ITO over >50, 60, 70, 80, or 90% of the electromagnetic spectrum between 180 nm and 20 µm.

In one embodiment, the modified region 144 of the conductive layer 140 may have a resistivity at least about 10×, 20×, 30×, or 50× or more, for example, higher than the unmodified region 142 or 146 of the conductive layer 140. In some embodiments, the modified region 144 of the conductive layer 140 may have a resistivity at least about 500 Ω-cm, 750 Ω-cm, 1 kΩ-cm, 1.5 kΩ-cm, 2 kΩ-cm, or 5 kΩ-cm. The modified region 144 of the conductive layer 140 may be chemically or mechanically different from the unmodified region 142 or 146 of the conductive layer 140. As noted above, chemically or mechanically different refers the film's electronic properties, such as resistivity or conductivity, being altered due to physical or chemical modification of the modified region of the film as compared to the unmodified region. This directs current flowing into the device via the bus bar 192 to preferentially spread out along the lower resistance top ITO layer rather than shorting directly to the bottom ITO layer. A similar region has been removed on the right hand side of the FIG. 1 to direct current from the bus bar 194 into the first conductive layer 140. In another embodiment, at least a part of the conductive layer, such as the modified region 144, may have been delaminated from an adjacent layer. The modified region 144 of the conductive layer 140 may have at least one of resistivity, crystallization, amorphization changed. The delamination may separate the first conductive layer 140 from the substrate 120. The delamination may separate the first conductive layer 140 from the overlayer 160.

It is contemplated that due to the delamination, there is a space or air between the first conductive layer 140 and the substrate 120 or the first conductive layer 140 and the overlayer 160. The first conductive layer 140 may be configured to expand in response to heat generated from irradiating at least the conductive layer 140 with a laser 110 through the substrate 120.

It is further contemplated that due to space or air or other physical changes to the film, the modified region 144 of the conductive layer 140 may have color change, quantified by CIE L*a*b* color coordinates about ΔE≥3 different from the unmodified region 142 or 146 of the conductive layer 140 in one embodiment. In another embodiment, the modified region 144 of the conductive layer 140 may have color change, quantified by CIE L*a*b* color coordinates about ΔE≥2 different from the unmodified region 142 or 146 of the conductive layer 140.

The conductive layer 140 may comprise, for example, a material selected from the group consisting of an oxide, such as a transparent metal oxide (e.g., ITO, IZO, AZO, $BaSnO_3$, CdO:In, etc), a metal-based material (e.g., silver-based, palladium-based), an alloy (e.g., ITO alloy, silver alloy), a doped material (e.g., ITO doped with cerium oxide), a multilayered conductive film (e.g., Au/Ag/Au), carbon nanotubes or graphene, conductive polymers, nanoparticles, or a combination of the above. In another embodiment, the oxide can be fluorine tin oxide (FTO).

Indium tin oxide (ITO) is a cost-effective conductor with good environmental stability, up to 90% transmission, and down to less than $1\times10^{-3}$ Ω-cm resistivity. An exemplary ITO layer 140 has a T≥80% in the visible region of light (about 400 nm to 700 nm) so that the film will be useful for display applications. In another embodiment, the at least one conductive layer 140 or 180 comprises a layer of low temperature ITO which is polycrystalline. The ITO layer may be 50-400 nm thick to achieve a sheet resistance of 1-60 Ω/square on glass.

The at least one conductive layer 140 or 180 can comprise other metal oxides such as indium oxide, titanium dioxide, cadmium oxide, gallium indium oxide, niobium pentoxide and tin dioxide. In addition to a primary oxide such as ITO, the at least one conductive layer 140 or 180 can also comprise a secondary metal oxide such as an oxide of cerium, an oxide of titanium, an oxide of zirconium, an oxide of hafnium, an oxide of tantalum ($TaO_3$), zinc peroxide ($ZnO_2$), zinc stannate ($Zn_2SnO_4$), cadmium stannate ($Cd_2SnO_4$), zinc indium oxide ($Zn_2In_2O_5$), magnesium indium oxide ($MgIn_2O_4$), and gallium oxide-indium oxide ($Ga_2O_3$—$In_2O_3$). The at least one conductive layer 140 or 180 is formed, for example, by a (low temperature) sputtering technique or by a direct current sputtering technique (DC-sputtering or RF-DC sputtering) depending upon the material(s) of the underlying layer.

For higher conductivities, the at least one conductive layer 140 or 180 may comprise a silver-based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In one embodiment, the at least one conductive layer 140 or 180 may comprise at least one of gold, silver and a gold/silver alloy, for example, a layer of silver coated on one or both sides with a thinner layer of gold. These higher conductive structures are formed, for example, employing a direct sputtering technique.

The elements aluminum (Al), copper (Cu), nickel (Ni), cadmium (Cd), gold (Au), zinc (Zn), magnesium (Mg), tin (Sn), indium (In), tantalum (ta), titanium (Ti), zirconium (Zr), cerium (Ce), silicon (Si), lead (Pb) or palladium (Pd) can also be used in other conductive elements or alloys to form the conductive layer 140 or 180.

In some embodiments, a second laser step is used to ablate at least part of the modified region of the conductive layer. The modification step changes the interaction of the glass-thin film or film-film interfaces and it allows localized ablation of bottom conductive layer with minimal changes to other thin film layers. In particular, when the modification of the conductive layer is delamination, it lends itself well to secondary ablation without damage to the other thin film layers.

The substrate 120 may be selected from the group consisting of glass, polymer, glass ceramics, and plastics. In particular, glass is advantageous due to its general impermeability to water and oxygen. The glass may be soda lime silicate glass (SLG). The glass may be an alkali-free or alkali-containing aluminoborosilicate or aluminosilicate, such as EAGLE XG® glass or Gorilla® Glass, which are made by Corning Incorporated, Corning, NY.

An exemplary substrate 120 may comprise a visible light-transmitting material, a flexible material such as plastic or a plastic film. "Plastic" means a high polymer, usually made from polymeric synthetic resins, which may be combined with other ingredients, such as curatives, fillers, reinforcing agents, colorants, and plasticizers. A "resin" is a synthetic or naturally occurring polymer. Plastic is solid in its finished state, and at some stage during its manufacture or processing into finished articles, can be shaped by flow. Plastic includes thermoplastic materials and thermosetting materials.

An exemplary substrate 120 may comprise heat-stabilized polyethylene terephthalate (HS-PET). However, other appropriate plastic substrates can be used, such as polyethylenenapthalate (PEN), polycarbonate (PC), polyarylate (PAR), polyetherimide (PEI), polyethersulphone (PES), polyimide (PI), Teflon poly(perfluoro-alboxy) fluoropolymer (PFA), poly(ether ketone) (PEEK), poly (ether ketone) (PEK), poly(ethylene tetrafluoroethylene) fluoropolymer (PETFE), and poly(methyl methacrylate) and various acrylate/methacrylate copolymers (PMMA). Certain of these plastic substrates can withstand higher processing temperatures of up to at least about 200° C. (some to about 300-350° C.) without damage. Various cyclic polyolefins—for example, ARTON made by JSR Corporation, Zeonor made by Zeon Chemicals L.P., and Topas made by Celanese AG—are also suitable for the substrate 120. Other low-temperature plastic substrates (both flexible and rigid) can also be used, including: ethylene-chlorotrifluoro ethylene (E-CTFE), made under the trademark HALAR by Ausimont U.S.A., Inc., ethylene-tetra-fluoroethylene (E-TFE) made under the trademark TEFZEL by Dupont Corporation, poly-tetrafluoro-ethylene (PTFE), fiber glass enhanced plastic (FEP), and high density polyethylene (HDPE). Although various examples of plastic substrates are set forth above, it should be appreciated that the substrate 120 can also be formed from other materials such as ceramic glass and quartz.

In an exemplary application as the core of the composite structure, the substrate 120 (for example, 700 µm in thickness) is by far the thickest layer of the film construction. Consequently, the substrate determines to a large extent the mechanical and thermal stability of the fully structured composite structure.

Figure 2:
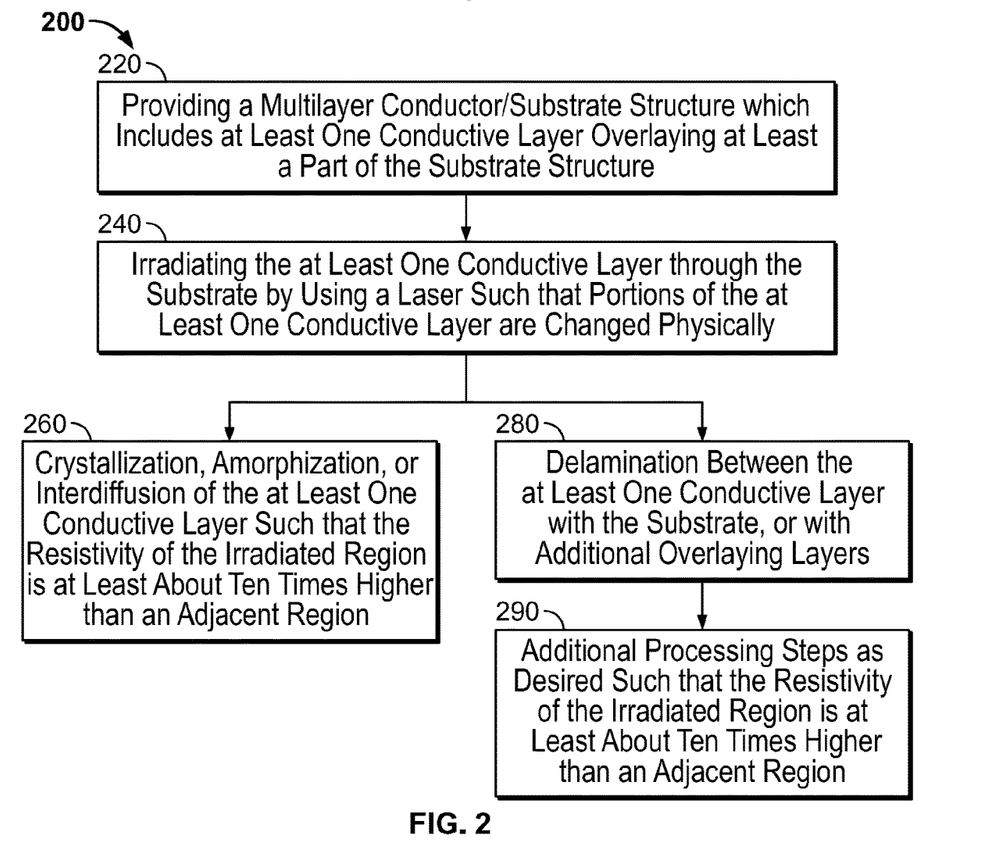
FIG. 2 illustrates a flow diagram of a method of making the electrochromic device as shown in FIG. 1 according to one embodiment.

In one embodiment, as shown in FIG. 2, a method 200 for modifying a multilayered conductor/substrate structure, such as the composite structure 100, may be carried out by providing a multilayer conductor/substrate structure which includes at least one conductive layer 140 overlaying at least a part of the substrate 120 in a step 220. The at least one conductive layer 140 may be irradiated through the substrate 120 by using a laser 110 such that modified region 144 of the at least one conductive layer 140 is changed physically in a step 240. In one embodiment, the physical change may include at least one of crystallization, amorphization of the at least one conductive layer such that the resistivity of the irradiated region is at least about ten times higher than an adjacent region in a step 260. In another embodiment, in a step 280, delamination may take place between the at least one conductive layer 140 with the substrate 120 or with additional overlaying layers, or the adjacent layer 160. Additional processing steps as desired may include further laser irradiation such that the resistivity of the irradiated region is about ten times higher than an adjacent region in a step 290.

In one embodiment, the multilayer conductor/substrate structure comprises an overlayer 160 sandwiched between two conductive layers 140 and 180. In one embodiment, the overlayer 160 may be made of a material that is selected from the group consisting of transition metal oxides and aluminum oxide ($Al_2O_3$). The transition metal may be selected from a group consisting of tungsten oxides ($WO_x$), titanium oxides and nickel oxides. The overlayer in some embodiments may be a semiconductive or conductive polymer, such as polypyrrole, viologen, PDOT, polyaniline, and the like.

In one embodiment, the first conductive layer 140 is deposited onto the substrate layer 120 by a sputtering technique or by a direct current sputtering technique. In one embodiment, an electrochromic film and second conductive layer are fabricated in an integrated deposition system where the glass substrate does not leave the integrated deposition system at any time during fabrication. In one embodiment, the first conductive layer is also formed using the integrated deposition system where the glass sheet does not leave the integrated deposition system during deposition of the EC film and the second conductive layer. In one embodiment, all of the layers including first conductive layer, EC film and second conductive layer are deposited in the integrated deposition system where the glass sheet does not leave the integrated deposition system during deposition.

One embodiment of the disclosure teaches an approach to electrically isolate the bottom conductive layer 140 using a two-step approach. The first step involves using a laser 110 as shown in FIG. 1 of suitable wavelength to delaminate the thin film layers from the glass substrate or at the film-film interface (the first face 162 of the overlayer 160). Delamination results in a buffer region for the subsequent laser ablation step which electrically isolates the bottom conductive film layer. In one embodiment, the laser irradiation may remain below a threshold for laser ablation. The wavelength of the laser may be selected from the group consisting of about 240 nm to about 360 nm and from about 1.0 micron to about 5.0 microns.

Suitable lasers for the delamination step may be highly absorptive by the conductive layer or the $WO_x$ film, or both. Since the conductive layer thickness is less than about a micron (1 µm), it is desirable that the absorption coefficient of the thin film at the laser wavelength is higher than $1/(1 \mu m) = 10^4$ cm$^{-1}$. With an absorption coefficient of $10^4$ cm$^{-1}$, 63% of the laser beam is absorbed within 1 µm film thickness and 37% of the laser beam is reflected or transmitted. In one embodiment, the wavelength of the laser is about 266 nm. In another embodiment, the wavelength of the laser is about 2 microns. A deep UV laser (266 nm) or an infrared laser (2 µm to 5 µm) is suitable candidates. Delamination occurs between the glass-thin films or film-film interfaces and allows localized ablation of bottom ITO thin film with minimal changes to other thin film layers.

The ITO thin film may have a resistivity on the order of 1 µΩ-cm. In contrast, the EC film stack has a resistivity close to 10 GΩ-cm. The EC films therefore prevent shorting across the ablated line. However, electrical modeling indicates that effective isolation can be achieved if the resistivity of the material in the ablated region is greater than about 10 kΩ-cm. Here, effective isolation may be defined as <0.1% of the total device current lost to shorting. Therefore the ITO layer does not need to be completely ablated. It is sufficient to merely reduce sheet resistance/resistivity in the film at the desired location.

The disruption in ITO sheet resistance/resistivity is achieved by laser irradiation from underneath the substrate. The step is performed at the end of film deposition, rather than immediately after the ITO layer. The laser may pass through glass with minimal absorption and may be preferentially absorbed at the ITO or adjacent layers. In one embodiment, an absorbing layer may be placed in contact with the ITO specifically for this purpose. In another embodiment, an absorbing layer may be placed overlaying the ITO. The ITO resistivity may be altered through crystallization, amorphization, interdiffusion between adjacent layers, changes in film stoichiometry, or a combination of these. If the laser flux is high enough device isolation can be achieved, and as long as it remains below the threshold for ablation the resistivity in overlying layers remains relatively unchanged. In one embodiment, some reductions in resistivity of the overlying layers would still permit proper device operation.

Figure 3:
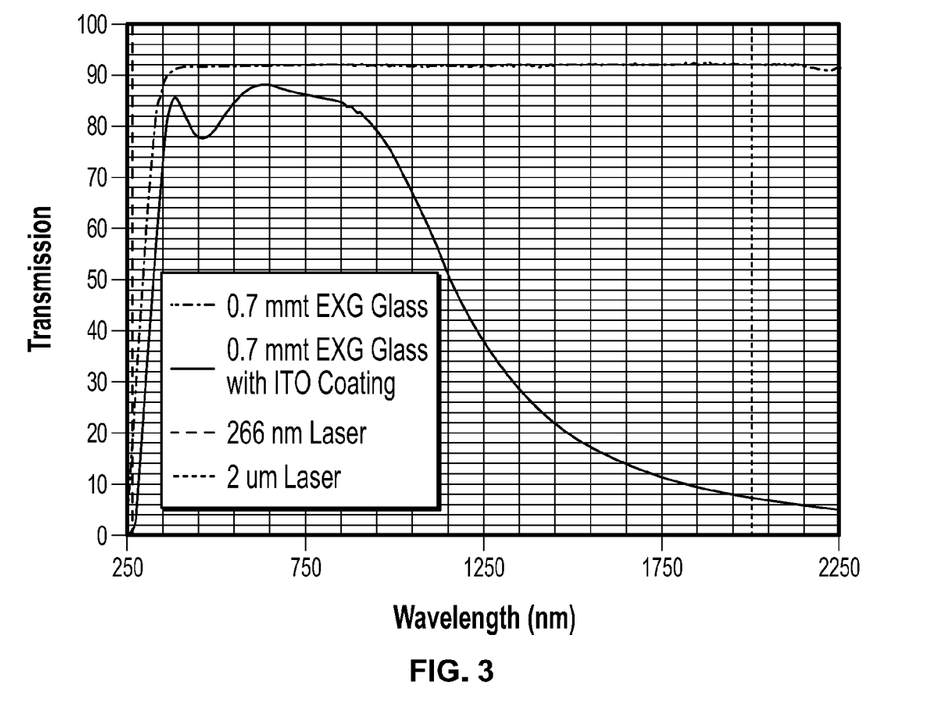
FIG. 3 is a graph showing transmission versus wavelength of EAGLE XG glass, bare and with indium tin oxide film. Wavelengths of two commercially available lasers (266 nm and 2 microns) of interest to the current invention disclosures are also shown.

FIG. 3 shows the absorption of EAGLE XG® glass and EAGLE XG® coated with ITO film. It can be seen that the ITO thin film has strong absorption in the deep UV (<275 nm) and beyond mid-IR (>1350 nm). Two commercially available pulsed lasers are suitable candidates for delamination and ablation processes, the frequency quadrupled Nd:YVO$_4$ laser with a wavelength of 266 nm and Q-switched thulium doped fiber laser at 2 µm wavelength.

EXPERIMENTAL

Experiments are conducted on test samples with ITO/$WO_x$/ITO or ITO/$Al_2O_3$/ITO film stacks. The lasers have wavelengths of 266 and 355 nm. At these wavelengths, the ITO (and $WO_x$) is highly absorbing. The laser is able to disrupt resistivity in the bottom ITO using backside irradiation. However the overlying films also shows some signs of damage. This is likely due in part to the fact that the glass substrate is also absorbing at these wavelengths. For example, 0.7 mm thick EAGLE XG® has only 15~20% transmission at 266 nm. Thinner glass has less absorption, thus using thinner glass as a substrate can help to get a wider process window at shorter wavelengths. Longer wavelengths, such as ≥1.5 µm, are believed likely to be more effective in selectively affecting the bottom ITO. Lasers operating at 266 nm wavelength and beyond 1.5 µm enable confined modification of ITO within a single ITO film. By controlling laser pulse energy, pulse overlap, and speed, the modification is limited to the bottom ITO film.

Figure 4:
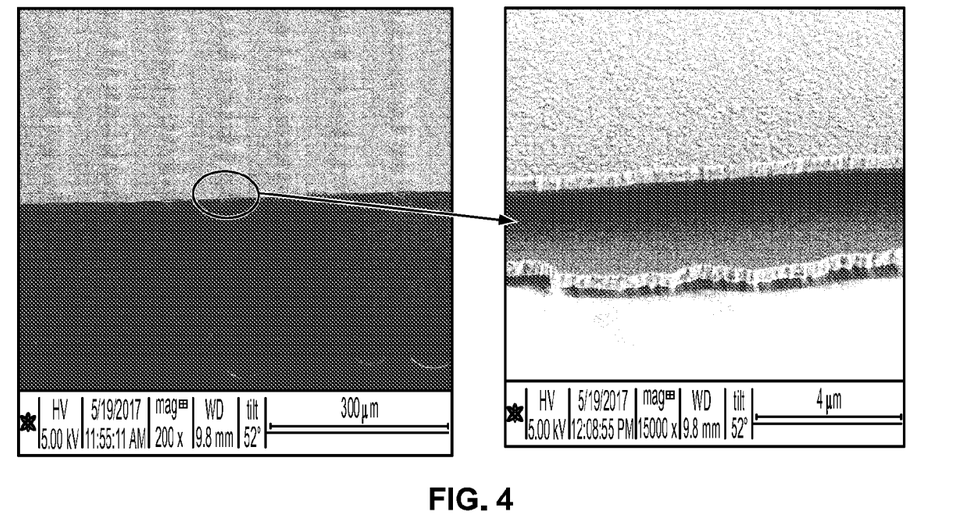
FIG. 4 illustrates a SEM micrograph image of delaminated ITO/$Al_2O_3$/ITO stack after backside irradiation at 266 nm. Insert: an enlarged view of one of the delaminated areas.

FIG. 4 shows a delaminated thin film stack composed of (ITO/$Al_2O_3$/ITO) thin film layers. The thin film stacks are deposited on a 0.3 mm EXG glass, with a layer thickness of about 400 nm individually and 1.2 µm in total thickness. A nanosecond 266 nm laser is used in the delamination process. The laser power is about 1.5 W, running at a repetition rate of 45 kHz. The laser beam is focused to a spot size of about 60 µm. The laser beam is incident onto the thin film stack from the glass side. At a speed of about 80 mm/s, continuous delamination between the bottom ITO layer and the $Al_2O_3$ thin film layer is observed. The right SEM image in FIG. 4 shows a clear void between the $Al_2O_3$ thin film layer and the bottom ITO layer.

Once the thin film stack has been delaminated from the substrate, a second laser step ablates the bottom ITO layer from the rest of the film stack. The layer absorbs sufficiently high laser flux to convert some or all of the ITO material to a plasma and remove it. This increases the resistance of the bottom ITO layer, causing current in the device to preferentially spread out along the lower resistance top ITO layer.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. For example, FIG. 1 is merely a schematic illustration of the layered structure of a composite structure 100, such as an electrochromic device, according to one embodiment of the present disclosure. An electrochromic device configurations are contemplated herein, the structural details of which may be conveniently gleaned from the present description, the accompanying drawings, and the appended claims. FIG. 1 is presented for illustrative purposes and is not intended to create a presumption that each of the various aspects illustrated therein is a necessary part of the various embodiments contemplated herein.

The claims appended hereto should be taken as the sole representation of the breadth of the present disclosure and the corresponding scope of the various embodiments described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is also noted that recitations herein of "at least one" component, element, etc., should not be used to create an inference that the alternative use of the articles "a" or "an" should be limited to a single component, element, etc.

It is further noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

As used herein, the term 'about' will be understood by persons of ordinary skill in the art and will vary to some extent on the context in which is used. If there are uses of the term which are not clear to persons of ordinary skill in the art given the context in which is used, 'about' will mean up to plus or minus 20% of the particular term.

As used herein, the term 'delamination' will be understood by persons of ordinary skill in the art and will vary to some extent on the context in which is used. If there are uses of the term which are not clear to persons of ordinary skill in the art given the context in which is used, 'delamination' used hereinafter refers to the breaking loose of the connection between one layer and another layer in contact which may occur regardless of how the connection is made.

As used herein, the term "optically transparent" as applied to an optically transparent substrate or an optically transparent plastic or glass material means that the substrate or plastic material has an absorbance of less than 1. That is, at least 10 percent of incident light is transmitted through the material at least one wavelength in a range between about 300 and about 800 nanometers.

As used herein, the term "optical" refers a range of visible, ultraviolet, and infrared light. The term "opaque" is used to define the optical properties of the enclosure. Essentially, this means the enclosure is made from a material that is blocking all of the incident light, i.e. visible, ultraviolet and infrared light.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A composite structure, comprising:
   (a) a substrate layer having a first face and a second face opposite the first face, the substrate layer comprising a material that has an optical transparency at a thickness of 2 mm of greater than 70% over at least a part of the electromagnetic spectrum from about 180 nm to about 1000 nm and a resistivity of about 1 kΩ-cm or greater;
   (b) a conductive layer comprising a material that is optically opaque over the electromagnetic spectrum from about 180 nm to about 20 μm, has a thickness of about 10 nm or greater, and comprises at least two regions, an unmodified and modified region,
   wherein the unmodified region of the conductive layer has a resistivity of 10 Ω-cm or less and the modified region of the conductive layer has a resistivity of about 1 kΩ-cm or greater; and
   the conductive layer further having a first face and a second face, the first face of the conductive layer being disposed on the at least a part of the second face of the substrate; and
   (c) an overlayer having a first face and a second face,
   wherein the first face of the overlayer is disposed on at least a part of the second face of the conductive layer such that the at least part of the modified region of the conductive layer is disposed between the overlayer and the substrate layer.

2. The composite structure of claim 1, wherein the overlayer disposed above the modified region is substantially the same physically or chemically as the overlayer disposed above the unmodified region.

3. The composite structure of claim 1, wherein the modified region is physically or chemically different than the unmodified region.

4. The composite structure of claim 3, wherein the modified region is physically different, wherein physically different means it has a different resistivity, crystalline structure, different amorphous structure or is made amorphous, or adhesion or contact between the overlayer and the modified region is changed.

5. The composite structure of claim 3, wherein the modified region is chemically different, wherein chemically different means the chemical structure or relative amounts of chemical constituents in a unit cell in the modified region is different from the unmodified region, or at least part of the modified region of the conductive layer interdiffuses into another layer in the composite structure.

6. The composite structure of claim 1, wherein the modified region is in physical contact with the overlayer disposed above it.

7. The composite structure of claim 1, wherein the composite structure of claim 1, wherein the modified region of the conductive layer is spatially separate from the overlayer disposed above it, and the spatial separation is at least 10 nm.

8. The composite structure of claim 7, wherein the spatially separated region between the conductive layer and the overlayer comprises a gas or void.

9. The composite structure of claim 1, wherein the modified region of the conductive layer has CIE L*a*b* color coordinates about ΔE≥2 different from the unmodified region of the conductive layer.

10. The composite structure of claim 9, wherein the modified region of the conductive layer has CIE L*a*b* color coordinates about ΔE≥3 different from the unmodified region of the conductive layer.

11. The composite structure of claim 1, wherein the conductive layer comprises a material selected from the group consisting of an oxide, a metal-based material, an alloy, and a doped material.

12. The composite structure of claim 3, wherein the conductive layer is configured to expand in response to heat generated from irradiating at least the conductive layer with a laser.

13. The composite structure of claim 3, wherein the physically different aspect comprises delamination, and the delamination separates the conductive layer from the substrate.

14. The composite structure of claim 3, wherein the physically different aspect comprises delamination, and the delamination separates the conductive layer from the overlayer.

15. A method for modifying multilayered structure, comprising steps of:
   (a) providing a multilayer structure comprising at least three layers including a substrate layer having a first face and a second face, a conductive layer having a first face and a second face, and an overlayer having a first face and a second face, wherein the first face of the conductive layer is adjacent to the second face of the substrate layer and the second face of the conductive layer is adjacent to the first face of the overlayer; and wherein
   the substrate layer comprises a material that has an optical transparency at a thickness of 2 mm of greater than 70% over at least a part of the electromagnetic spectrum from about 180 nm to about 1000 nm and a resistivity of about 1 kΩ-cm or greater,
   the conductive layer comprises a layer having a thickness of about 10 nm or greater and comprises an unmodified and modified region, wherein the unmodified region of the conductive layer has a resistivity of 10 Ω-cm or less; and
   the conductive layer further having a first face and a second face, the first face of the conductive layer being disposed on the at least a part of the second face of the substrate, and
   an overlayer having a first face and a second face, wherein the first face of the overlayer is disposed on at least a part of the second face of the conductive layer such that the at least part of the modified region of the conductive layer is disposed between the overlayer and the substrate layer
   (b) irradiating a portion of the conductive layer through the substrate layer by using a laser having a wavelength of from about 180 nm to about 20 μm to produce a modified region such that the modified region of the conductive layer irradiated by the laser undergoes a physical or chemical modification and has a resistivity of about 1 kΩ-cm or greater while the overlayer in disposed on the modified region has a resistivity that is unchanged,
   wherein the conductive layer is optically opaque over the electromagnetic spectrum from about 180 nm to about 20 μm.

16. The method of claim 15, wherein the substrate is comprises a glass.

17. The method of claim 15, wherein the physical change includes at least one of crystallization, amorphization of the at least one conductive layer, interdiffusion or delamination between adjacent layers.

* * * * *